(12) United States Patent
Cheng et al.

(10) Patent No.: US 8,976,634 B2
(45) Date of Patent: Mar. 10, 2015

(54) DEVICES INCLUDING AT LEAST ONE INTERMIXING LAYER

(71) Applicant: Seagate Technology LLC, Cupertino, CA (US)

(72) Inventors: Yuhang Cheng, Edina, MN (US); Tong Zhao, Eden Prairie, MN (US); Michael C. Kautzky, Eagan, MN (US); Ed F. Rejda, Bloomington, MN (US); Kurt W. Wierman, Eden Prairie, MN (US); Scott Franzen, Savage, MN (US); Michael Allen Seigler, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/313,540

(22) Filed: Jun. 24, 2014

(65) Prior Publication Data

US 2014/0376348 A1    Dec. 25, 2014

Related U.S. Application Data

(60) Provisional application No. 61/838,407, filed on Jun. 24, 2013.

(51) Int. Cl.
*G11B 11/00*    (2006.01)
*G11B 13/08*    (2006.01)
(Continued)

(52) U.S. Cl.
CPC .............. *G11B 13/08* (2013.01); *G11B 5/4866* (2013.01); *G11B 2005/0021* (2013.01)
USPC ..................................... 369/13.33; 369/13.13

(58) Field of Classification Search
CPC ..................... G11B 5/4866; G11B 2005/0021; G11B 5/314; G11B 5/6088; G11B 2005/001; G11B 7/1387; G11B 11/10554; G11B 11/1058; G11B 7/1384; G11B 5/3133; G11B 13/08; G11B 5/84
USPC .......... 369/13.33, 13.32, 13.24, 13.14, 13.03, 369/13.02, 13.12, 13.13, 13.22, 13.01, 369/13.35, 112.27; 360/59, 125.31, 125.74
See application file for complete search history.

(56) References Cited

U.S. PATENT DOCUMENTS

| 4,492,873 A | 1/1985 | Dmitriev |
| 5,482,611 A | 1/1996 | Helmer |

(Continued)

FOREIGN PATENT DOCUMENTS

| EP | 024088 | 10/1987 |
| EP | 0 580 368 A2 | 1/1994 |

(Continued)

OTHER PUBLICATIONS

U.S. Appl. No. 13/923,925, Jun. 21, 2013, Pitcher.

(Continued)

*Primary Examiner* — Ali Neyzari
(74) *Attorney, Agent, or Firm* — Mueting, Raasch & Gebhardt, P.A.

(57) ABSTRACT

Devices that include a near field transducer (NFT), the NFT including a peg having five exposed surfaces, the peg including a first material; an overlying structure; at least one intermixing layer, positioned between the peg and the overlying structure, the at least one intermixing layer positioned on at least one of the five surfaces of the peg, the intermixing layer including at least the first material and a second material.

20 Claims, 4 Drawing Sheets

(51) Int. Cl.
*G11B 5/48* (2006.01)
*G11B 5/00* (2006.01)

(56) References Cited

U.S. PATENT DOCUMENTS

| | | | |
|---|---|---|---|
| 5,849,093 A | 12/1998 | Andra | |
| 5,945,681 A | 8/1999 | Tokiguchi | |
| 6,130,436 A | 10/2000 | Renau | |
| 6,144,098 A | 11/2000 | Iyer | |
| 6,589,676 B1 | 7/2003 | Gui | |
| 6,632,483 B1 | 10/2003 | Callegari | |
| 6,641,932 B1 | 11/2003 | Xu | |
| 6,683,426 B1 | 1/2004 | Kleeven | |
| 6,909,103 B2* | 6/2005 | Platzgummer et al. | 250/492.21 |
| 7,018,729 B2 | 3/2006 | Pocker | |
| 7,377,228 B2 | 5/2008 | Mack | |
| 7,476,855 B2 | 1/2009 | Huang | |
| 7,544,958 B2* | 6/2009 | Low | 250/492.21 |
| 7,609,003 B2* | 10/2009 | Horsky et al. | 315/111.81 |
| 7,965,464 B2* | 6/2011 | Batra et al. | 360/59 |
| 7,998,607 B2* | 8/2011 | Ikeda | 428/836.2 |
| 8,031,561 B2* | 10/2011 | Hellwig et al. | 369/13.01 |
| 8,040,761 B2* | 10/2011 | Kawamori et al. | 369/13.33 |
| 8,248,891 B2* | 8/2012 | Lee et al. | 369/13.17 |
| 8,351,151 B2 | 1/2013 | Katine | |
| 8,400,902 B2 | 3/2013 | Huang | |
| 8,405,056 B2* | 3/2013 | Amaldi et al. | 250/505.1 |
| 8,411,393 B2* | 4/2013 | Zou et al. | 360/316 |
| 8,427,925 B2* | 4/2013 | Zhao et al. | 369/112.23 |
| 8,514,673 B1* | 8/2013 | Zhao et al. | 369/13.33 |
| 8,830,800 B1* | 9/2014 | Pitcher et al. | 369/13.33 |
| 2005/0012052 A1 | 1/2005 | Platzgummer | |
| 2006/0238133 A1 | 10/2006 | Horsky | |
| 2008/0230724 A1 | 9/2008 | Low | |
| 2010/0123965 A1 | 5/2010 | Lee | |
| 2010/0123967 A1 | 5/2010 | Batra | |
| 2010/0190036 A1 | 7/2010 | Komvopoulos | |
| 2010/0320403 A1 | 12/2010 | Amaldi | |
| 2010/0329085 A1 | 12/2010 | Kawamori | |
| 2011/0006214 A1 | 1/2011 | Bonig | |
| 2011/0026161 A1 | 2/2011 | Ikeda | |
| 2011/0096431 A1 | 4/2011 | Hellwig | |
| 2011/0205863 A1 | 8/2011 | Zhao | |
| 2013/0161505 A1 | 6/2013 | Pitcher | |
| 2013/0164453 A1 | 6/2013 | Pitcher | |
| 2013/0164454 A1 | 6/2013 | Pitcher | |
| 2013/0288077 A1 | 10/2013 | Dhawan | |
| 2014/0004384 A1 | 1/2014 | Zhao | |
| 2014/0113160 A1 | 4/2014 | Pitcher | |
| 2014/0307534 A1* | 10/2014 | Zhou et al. | 369/13.33 |

FOREIGN PATENT DOCUMENTS

| | | |
|---|---|---|
| EP | 0942072 | 9/1999 |
| EP | 1328027 | 7/2003 |
| EP | 2106678 | 10/2008 |
| WO | WO 97/45834 | 12/1997 |
| WO | WO 2013/163195 | 10/2013 |
| WO | WO 2013/163470 | 10/2013 |

OTHER PUBLICATIONS

U.S. Appl. No. 14/062,651, Oct. 24, 2013, Zou.
Al-Bayati et al., Junction Profiles of Sub keV Ion Implantation for Deep Sub-Quarter Micron Devices, *IEEE*, 2000, pp. 87-90.
Angel et al., "Enhanced Low Energy Drift-Mode Beam Currents in a High Current Ion Implanter," *IEEE*, 1999, pp. 219-222.
Druz et al., "Diamond-Like Carbon Films Deposited Using a Broad, Uniform Ion Beam from an RF Inductively Coupled CH4-Plasma Source", Diamond and Related Materials, vol. 7, No. 7, Jul. 1998, pp. 965-972.
Liu et al., "Influence of the Incident Angle of Energetic Carbon Ions on the Properties of Tetrahedral Amorphous Carbon (ta-C) films", *Journal of Vacuum Science and Technology*, vol. 21, No. 5, Jul. 25, 2003, pp. 1665-1670.
Metallization: "Metallization"; chapter 5, In: Kris v. Srikrishnan and Geraldine C. Schwartz: "Handbook of Semiconductor Interconnection Technology, Second Edition", 2006, CRC Press, Boca Raton, FL, USA, XP002711255, ISBN:978-1-4200-1765-6, pp. 311-382, Section 5.4.1.2 Adhesion; p. 320.
Piazza et al., "Large Area Deposition of Hydrogenated Amorphous Carbon Films for Optical Storage Disks", Diamond and Related Materials, vol. 13, No. 4-8, Apr. 2004, pp. 1505-1510.
Robertson, J., "Diamond-Like Amorphous Carbon," *Materials Science and Engineering R 37*, 2002, pp. 129-281.
Satoh et al., "Evaluation of Adhesion Materials for Gold Line-and-Space Surface Plasmon Antenna on SO1-MOS Photodiode", Silicon Nanoelectronics Workshop (SNW), 2010, *IEEE*, Piscataway, NJ, USA, Jun. 13, 2010, pp. 1-2.
Vogt, K.W. et al., "Characterization of Thin Titanium Oxide Adhesion Layers on Gold Resistivity, Morphology, and Composition", *Surface Science*, North-Holland, Amsterdam, NL, vol. 301, No. 1-3, Jan. 10, 1994, pp. 203-213.

* cited by examiner

DEVICES INCLUDING AT LEAST ONE INTERMIXING LAYER

CROSS REFERENCE TO RELATED APPLICATION

This application claims priority to U.S. Provisional Application No. 61/838,407 entitled, STRUCTURES INCLUDING NEAR FIELD TRANSDUCERS AND ASSOCIATED LAYERS, filed on Jun. 24, 2013, the disclosure of which is incorporated herein by reference thereto.

SUMMARY

Disclosed are devices that include a near field transducer (NFT), the NFT including a peg having five exposed surfaces, the peg including a first material; an overlying structure; at least one intermixing layer, positioned between the peg and the overlying structure, the at least one intermixing layer positioned on at least one of the five surfaces of the peg, the intermixing layer including at least the first material and a second material.

Also disclosed are devices that include a near field transducer (NFT), the NFT including a peg having five exposed surfaces; at least one seed layer, the at least one seed layer positioned on at least one of the five surfaces of the peg, the seed layer including at least a first material; an overlying structure; at least one intermixing layer, positioned between the seed layer and the overlying structure, the at least one intermixing layer positioned on at least one of the five surfaces of the peg, the intermixing layer including at least the first material and a second material.

Also disclosed are devices that include an energy source; a near field transducer (NFT), the NFT configured to receive energy from the energy source, the NFT including a peg having five exposed surfaces, the peg including a first material; an overlying structure; and at least one intermixing layer, positioned between the peg and the overlying structure, the at least one intermixing layer positioned on at least one of the five surfaces of the peg, the intermixing layer including at least the first material and a second material.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Heat assisted magnetic recording (referred to through as HAMR) utilizes radiation, for example from a laser, to heat media to a temperature above its curie temperature, enabling magnetic recording. In order to deliver the radiation, e.g., a laser beam, to a small area (on the order of 20 to 50 nm for example) of the medium, a NFT is utilized. During a magnetic recording operation, the NFT absorbs energy from a laser and focuses it to a very small area; this can cause the temperature of the NFT to increase. The temperature of the NFT can be elevated up to about 400° C. or more.

In some embodiments, a NFT can include a small peg and a large disk. The very high temperatures that the NFT reaches during operation can lead to diffusion of the material of the NFT (for example gold) from the peg and towards the disk. This can lead to deformation and recession of the peg, which can lead to failure of the NFT and the entire head.

Disclosed devices include one or more layers adjacent one or more surfaces of the peg of the NFT to increase or improve adhesion of the peg material to the surrounding materials or structures within the device while taking mismatches in coefficients of thermal expansion, crystalline structure, and lattice spacing into consideration.

Figure 1:
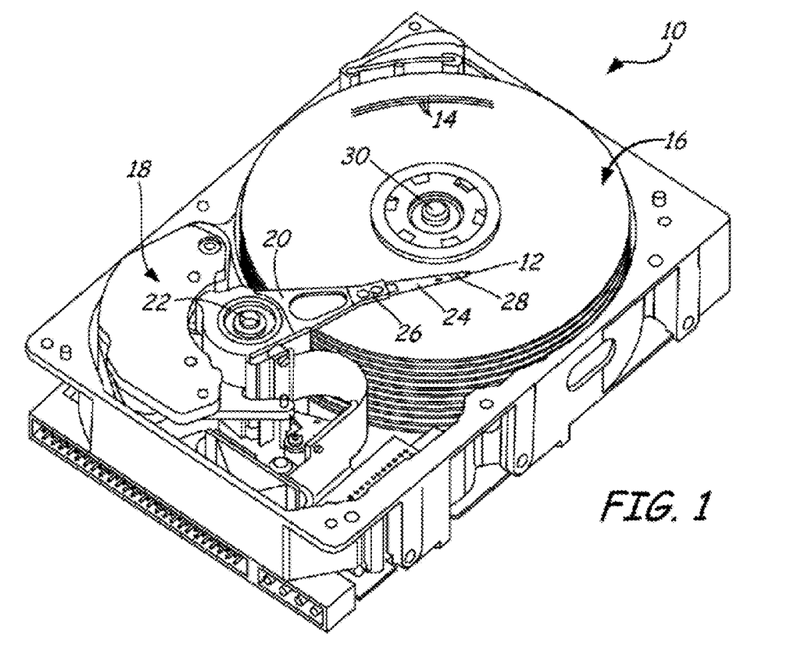
FIG. 1 is a perspective view of a magnetic disc drive that can include HAMR devices.

FIG. 1 is a perspective view of disc drive 10 including an actuation system for positioning slider 12 over track 14 of magnetic medium 16. The particular configuration of disc drive 10 is shown for ease of description and is not intended to limit the scope of the present disclosure in any way. Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data. Slider 12 carries a magnetic device or transducer (not shown in FIG. 1) for reading and/or writing data on tracks 14 of magnetic medium 16. The magnetic transducer utilizes additional electromagnetic energy to heat the surface of medium 16 to facilitate recording by a process termed heat assisted magnetic recording (HAMR).

Figure 2:
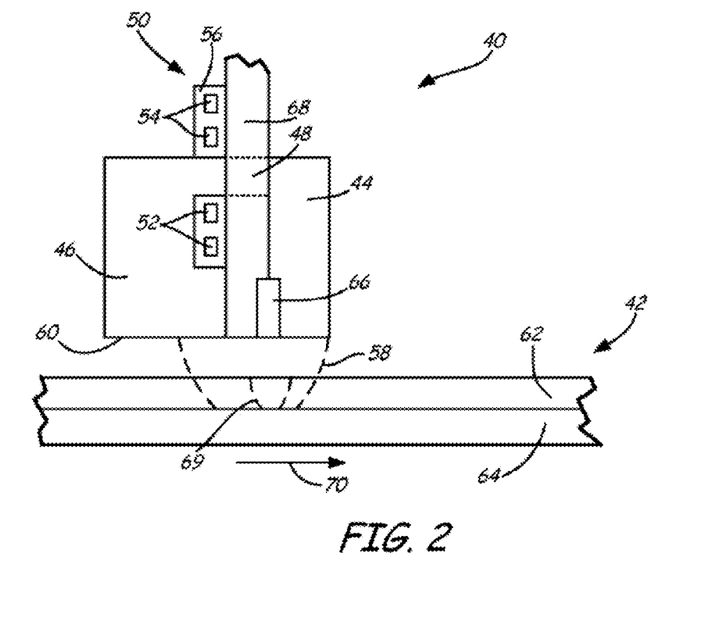
FIG. 2 is a cross sectional view of a perpendicular HAMR magnetic recording head and of an associated recording medium.

A HAMR transducer includes a magnetic writer for generating a magnetic field to write to a magnetic medium (e.g. magnetic medium 16) and an optical device to heat a portion of the magnetic medium proximate to the write field. FIG. 2 is a cross sectional view of a portion of a magnetic device, for example a HAMR magnetic device 40 and a portion of associated magnetic storage medium 42. HAMR magnetic device 40 includes write pole 44 and return pole 46 coupled by pedestal 48. Coil 50 comprising conductors 52 and 54 encircles the pedestal and is supported by an insulator 56. As shown, magnetic storage medium 42 is a perpendicular magnetic medium comprising magnetically hard storage layer 62 and soft magnetic underlayer 64 but can be other forms of media, such as patterned media. A current in the coil induces a magnetic field in the pedestal and the poles. Magnetic flux 58 exits the recording head at air bearing surface (ABS) 60 and is used to change the magnetization of portions of magnetically hard layer 62 of storage medium 42 enclosed within region 58. Near field transducer 66 is positioned adjacent the write pole 44 proximate air bearing surface 60. Near field transducer 66 is coupled to waveguide 68 that receives an electromagnetic wave from an energy source such as a laser. An electric field at the end of near field transducer 66 is used to heat a portion 69 of magnetically hard layer 62 to lower the coercivity so that the magnetic field from the write pole can affect the magnetization of the storage medium.

Devices disclosed herein can also include other structures. Devices disclosed herein can be incorporated into larger devices. For example, sliders can include devices as disclosed herein. Exemplary sliders can include a slider body that has a leading edge, a trailing edge, and an air bearing surface. The write pole, read pole, optical near field transducer and contact pad (and optional heat sink) can then be located on (or in) the slider body. Such exemplary sliders can be attached to a suspension which can be incorporated into a disc drive for example. It should also be noted that disclosed devices can be utilized in systems other than disc drives such as that depicted in FIG. 1.

Figure 3A:
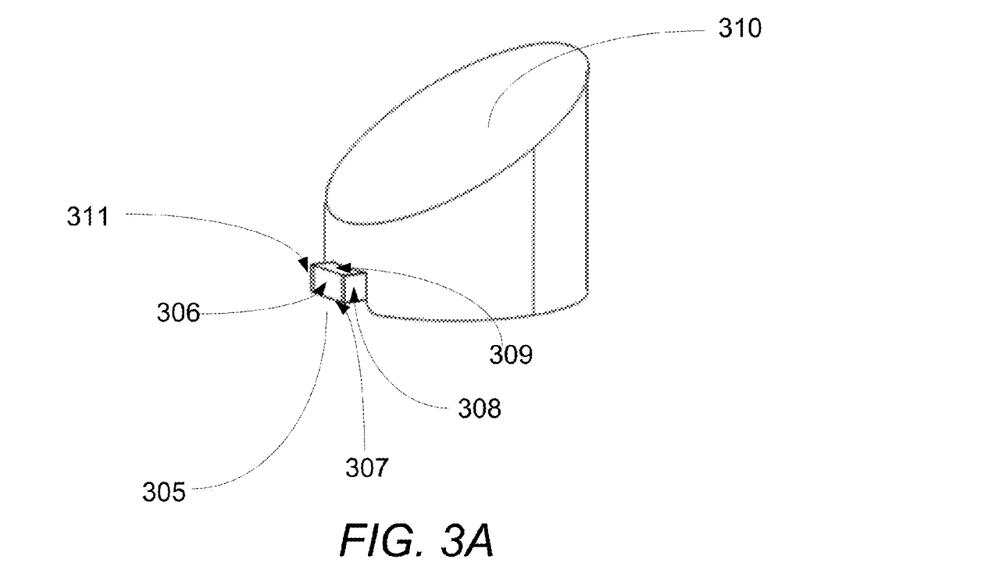
FIGS. 3A and 3B are a perspective views of an illustrative NFT (FIG. 3A) and the peg thereof (FIG. 3B).
Figure 3B:
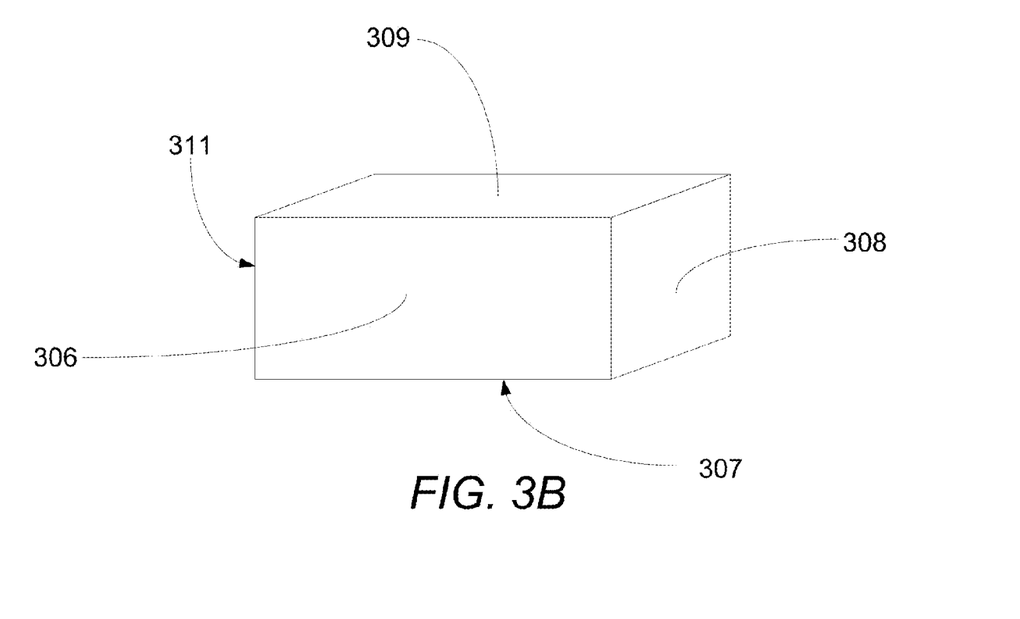

FIGS. 3A and 3B show an example of the peg and disc of a peg and disc type NFT, and FIG. 3B shows a closer view of only the peg of the peg and disc type NFT shown in FIG. 3A. The NFT in FIG. 3A includes a peg 305 and a disc 310. The peg 305 shown in FIGS. 3A and 3B includes five surfaces that are not in contact with the disc 310, an air bearing surface 306, a first surface 307, a second surface 309, a third surface 308, and a fourth surface 311.

In some embodiments, the second surface 309 and the first surface 307 are facing the pole and core respectively. In some embodiments, the third surface 308 and the fourth surface 311 are not facing the pole or the core. More specifically, the third surface 308 would be located in front of the paper on which FIG. 2 is depicted and the fourth surface 311 would be located behind the paper on which FIG. 2 is depicted. In some embodiments, the second surface 309 can also be referred to as the NFT-pole surface which faces a NFT-pole space, which can be referred to as a NPS (not shown herein). In some embodiments, the first surface 307 can also be referred to as the NFT-core surface, which faces a NFT-core space, which can be referred to as CNS (not shown herein). In some embodiments, the third surface 308 can also be described as the surface which faces the left side of a device, in some embodiments; a left solid immersion mirror can be located there. In some embodiments, the fourth surface 311 can also be described as the surface which faces the right side of a device, in some embodiments; a right solid immersion mirror can be located there.

Disclosed devices can include one or more intermixing layers located on one or more surfaces of a NFT. In some embodiments, disclosed devices can include one or more intermixing layers located on one or more surfaces of a peg of a NFT. In some embodiments, disclosed devices can include intermixing layers located on two or more surfaces of a peg of a NFT. In some embodiments, disclosed devices can include intermixing layers located on three or more surfaces of a peg of a NFT. In some embodiments, disclosed devices can include intermixing layers located on four or more surfaces of a peg of a NFT. In some embodiments, disclosed devices can include intermixing layers located on all five surfaces of a peg of a NFT. In some embodiments disclosed devices can include intermixing layers located on each of the first surface 307, the second surface 309, the third surface 308, and the fourth surface 311.

Disclosed intermixing layers can function to provide various characteristics. In some embodiments, intermixing layers can be used to improve the adhesion of different layers having (in some embodiments) significantly different physical, mechanical, and thermal properties. Intermixing layers can include materials from the layers or structures on both adjacent surfaces thereof. This combination of materials from adjacent layers or structures can reduce differences in physical, mechanical, and thermal properties. The addition of an intermixing layer may serve to reduce thermal stress caused by CTE differences, reduce interface stresses caused by the crystalline structure and lattice spacing difference, and reduce interface energy. Addition of an intermixing layer could also reduce defects at the interface. Typically, defects at the interface are an important path for diffusion of atoms of the NFT during peg recession. As a result, addition of an intermixing layer could further improve the thermal stability of a peg.

Disclosed intermixing layers can consist of only a single layer or more than one layer. Disclosed intermixing layers can also be used in combination with other layers. Generally, disclosed intermixing layers function to promote adhesion and the modulation of one or more physical and/or mechanical properties of the structures or layers on either side of the intermixing layer. Disclosed intermixing layers can be located between an underlying structure and an overlying structure. In some embodiments, an intermixing layer can be located between an underlying structure that is a NFT or a peg of a NFT and an overlying structure that is a surrounding structure such as the CNS, the NPS, the head overcoat, or cladding for example. In some embodiments, an intermixing layer can be located between an underlying structure that is a NFT or a peg of a NFT and an overlying structure that is a seed layer. In some embodiments, an intermixing layer can be located between an underlying structure that is a seed layer (for example a seed layer positioned on a NFT or a peg of a NFT) and an overlying structure such as the CNS, the NPS, the head overcoat, or cladding for example.

Figure 4A:
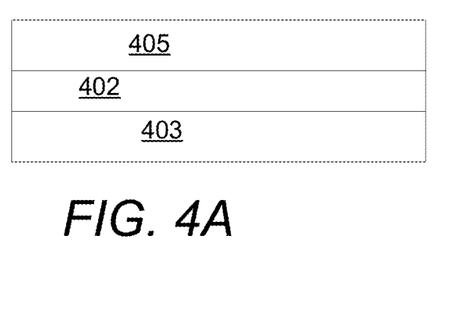
FIGS. 4A, 4B, and 4C are cross sections of devices including disclosed intermixing layers.

FIG. 4A depicts a cross section of a portion of a device including a disclosed intermixing layer. FIG. 4A shows an intermixing layer 402. The device also includes an underlying structure 403 and an overlying structure 405. In some embodiments, the underlying structure can include a NFT or more specifically a peg of a NFT for example. In some embodiments, the underlying structure can include a seed layer, which may or may not be positioned on an underlying NFT, or more specifically a peg of a NFT, for example. In some embodiments, the overlying structure can include surrounding or overlying structures. Illustrative surrounding or overlying structures can include, for example dielectric materials such as oxides, nitrides, or fluorides, typically those with low refractive indices and low absorption. Specific illustrative materials that surrounding or overlying structures can be made out of can include, for example SiO, AlO, MgO, $B_2O_3$, YO, SrO, CaO, NdO, HoO, ErO, TmO, BeO, ITO, TaO, CrO, NbO, BN, SiN, AlN, LiF, KF, NaF, RbF, $MgF_2$, $CaF_2$, $SrF_2$, $BaF_2$, $FeF_2$, $MnF_2$, $NiF_2$, $ZnF_2$, $CdF_2$, $LaF_3$, $PbF_2$, $EuF_2$, $CeF_3$, $PrF_3$, $NdF_3$, and $TbF_3$. In some embodiments, the overlying structure can include, for example the CNS, the NPS, cladding, head overcoat (HOC) layer, or combinations thereof.

In some embodiments, an intermixing layer can include at least two materials. The at least two materials can include a first material and a second material. The first material can be a material that is found in the underlying structure 403 or a material that is compatible with the underlying structure 403. The underlying structure 403 can be described as being located directly below, in physical contact with, the intermixing layer (or directly below, in physical contact with a first surface of the intermixing layer). The second material can be a material that is found in the overlying structure 405 or a material that is compatible with the overlying structure 405. A material being compatible with another material generally means that the two materials adhere to each other relatively well, e.g., have a relatively high adhesion strength, have relatively little mismatch in physical and mechanical properties, e.g., have similar coefficients of thermal expansion (CTE), similar lattice constants, similar crystal structures, or some combination thereof. The overlying structure 405 can be described as being located directly above, in physical contact with, the intermixing layer (or directly below, in physical contact with a second surface of the intermixing layer where the first surface is opposite the second surface). Disclosed intermixing layers can also be described as including a first material and a second material, the first and second material being in common with or compatible with layers or structures adjacent the intermixing layer.

In some embodiments, an intermixing layer (which is located adjacent an underlying structure that is a NFT, or a peg of a NFT) can include a first material and a second material, where the first material is a material that is also in the underlying NFT. Illustrative NFT materials can include plasmonic materials including, for example gold (Au), silver (Ag), aluminum (Al), copper (Cu), ruthenium (Ru), rhodium (Rh), iridium (Ir), or alloys thereof; thermally conductive oxides, and indium tin oxide (ITO). In some embodiments, illustrative NFT materials can also include those disclosed in U.S. Patent Publication No. 2013/0286799, U.S. Pat. No. 8,427,925, and U.S. patent application Ser. No. 13/923,925 entitled MAGNETIC DEVICES INCLUDING FILM STRUCTURES, filed on Jun. 21, 2013, and Ser. No. 14/062,651 entitled RECORDING HEADS INCLUDING NFT AND HEATSINK, filed on Oct. 24, 2013, the disclosures of which are incorporated herein by reference thereto. In some embodiments, an intermixing layer can include gold as a first material.

In some embodiments, an intermixing layer (which is located adjacent an underlying structure that is a seed layer) can include a first material and a second material, where the first material is a material that is also in the underlying seed layer. Illustrative seed layer materials can include, for example rhenium (Re), tungsten (W), osmium (Os), iridium (Ir), platinum (Pt), hafnium (Hf), tantalum (Ta), ruthenium (Ru), technetium (Tc), molybdenum (Mo), niobium (Nb), rhodium (Rh), palladium (Pd), beryllium (Be), chromium (Cr), silicon (Si), nickel (Ni), titanium (Ti), aluminum (Al), yttrium (Y), vanadium (V), magnesium (Mg), manganese (Mn), cobalt (Co), or combinations thereof. Alloys of two or more metals can also be utilized.

In some embodiments, an intermixing layer can include a first material and a second material, where the second material is a material that is also in or is compatible with the overlying structure. In some embodiments, an intermixing layer can have a seed layer as the overlying structure. Illustrative materials that may be included in seed layers and therefore can be included as the second material can include, for example rhenium (Re), tungsten (W), osmium (Os), iridium (Ir), platinum (Pt), hafnium (Hf), tantalum (Ta), ruthenium (Ru), technetium (Tc), molybdenum (Mo), niobium (Nb), rhodium (Rh), palladium (Pd), beryllium (Be), chromium (Cr), silicon (Si), nickel (Ni), titanium (Ti), aluminum (Al), yttrium (Y), vanadium (V), magnesium (Mg), manganese (Mn), cobalt (Co), zirconium (Zr), neodymium (Nd), or combinations thereof. Alloys of two or more metals can also be utilized.

In some embodiments, an intermixing layer can include a first material and a second material, where the second material is a material that is compatible with the overlying structure. In some embodiments, materials that are compatible with the overlying structures can include materials that are commonly used as adhesion layers. Illustrative adhesion layer materials can include those disclosed in, for example U.S. Patent Publication Number 2014-0004384, PCT Application Number PCT/US2013/038280, and commonly assigned and concurrently filed U.S. patent application having Ser. No. 13/313,574 entitled DEVICES INCLUDING AT LEAST ONE ADHESION LAYER that claims priority to U.S. Provisional Application No. 61/838,394, having as inventors Cheng, Zhao, Kautzky, Rejda, Wierman, Franzen, and Boyne; the disclosures of which are incorporated herein by reference thereto.

In some embodiments, an intermixing layer can include a first material and a second material, where the second material is a material that is compatible with the overlying structure. Illustrative types of overlying structures can include the CNS, the NPS, cladding, or head overcoat. In some embodiments, materials that are compatible with the overlying structures can include, for example metals, oxides, nitrides, carbides, or sulfides. Illustrative materials that can be considered compatible with the CNS, NPS or cladding can include metals that are relatively easily oxidized, oxides, and nitrides for example. Specific illustrative metals can include, titanium (Ti), zirconium (Zr), iridium (Ir), chromium (Cr), tantalum (Ta), aluminum (Al), silicon (Si), indium (In), magnesium (Mg), beryllium (Be), hafnium (Hf), manganese (Mn), niobium (Nb), boron (B), nickel (Ni), vanadium (V), yttrium (Y), cobalt (Co), osmium (Os), and combinations thereof for example. Specific illustrative oxides can include aluminum oxide (AlO), silicon oxide (SiO), chromium oxide (CrO), niobium oxide (NbO), titanium oxide (TiO), hafnium oxide (HfO), zirconium oxide (ZrO), tantalum oxide (TaO), indium oxide (InO), tin oxide (SnO), indium tin oxide (ITO), magnesium oxide (MgO), yttrium oxide (YO), manganese oxide (MnO), strontium oxide (SrO), and combinations thereof for example. Oxides including two or more non-oxygen atoms can also be utilized herein. Specific illustrative nitrides can include titanium nitride (TiN), zirconium nitride (ZrN), chromium nitride (CrN), hafnium nitride (HfN), niobium nitride (NbN), silicon nitride (SiN), aluminum nitride (AlN), boron nitride (BN), tantalum nitride (TaN), and combinations thereof for example. Nitrides including two or more non-nitrogen atoms can also be utilized herein.

In some embodiments, the second material in an intermixing layer can include a metal, specific illustrative metals can include for example rhenium (Re), osmium (Os), iridium (Ir), platinum (Pt), tantalum (Ta), ruthenium (Ru), technetium (Tc), rhodium (Rh), palladium (Pd), beryllium (Be), aluminum (Al), manganese (Mn), indium (In), boron (B), or combinations thereof. In some embodiments, the metal can include specific illustrative metals such as for example Pt, Ir, Al, Rh, Ru, Pd, or combinations thereof. In some embodiments, the metal can include specific illustrative metals such as for example Pt, Ir, Al, or combinations thereof. In some embodiments, the metal can include specific illustrative metals such as for example Pt. In some embodiments, the metal can include specific illustrative metals such as for example Ir. In some such embodiments, the metal can include specific illustrative metals such as for example Ir, Pt, Pd, Ru, Rh, Re, Ta, Nb, Os, Al, B, or combinations thereof. Alloys of two or more metals can also be utilized.

In some embodiments, the second material in an intermixing layer can include a metal, specific illustrative metals can include for example tungsten (W), molybdenum (Mo), chromium (Cr), silicon (Si), nickel (Ni), titanium (Ti), yttrium (Y), vanadium (V), magnesium (Mg), cobalt (Co), tin (Sn), niobium (Nb), hafnium (Hf), or combinations thereof. In some embodiments, the metal can include specific illustrative metals such as for example Cr, Ni, Sn, or combinations thereof. In some embodiments, the metal can include specific illustrative metals such as for example Cr, Sn, or combinations thereof. In some such embodiments, the metal can include specific illustrative metals such as for example W, Ti, Cr, Si, Ni, or combinations thereof. Alloys of two or more metals can also be utilized.

In some embodiments, the second material in an intermixing layer can include a metal, specific illustrative metals can include for example Re, Os, Ir, Pt, Hf, Ta, Ru, Tc, Nb, Rh, Pd, Be, Al, Mn, In, W, Mo, Cr, Si, Ni, Ti, Zr, Y, V, Mg, Co, Sn, or combinations thereof. In some such embodiments, the metal can include specific illustrative metals such as for example Ir, Pt, Pd, Nb, Ru, Re, Ta, Os, Al, B, W, Ti, Cr, Si, Ni, or combinations thereof. In some embodiments, the metal can include specific illustrative metals such as for example Pt, Ir, Al, Cr, Ni, Sn, or combinations thereof. In some embodiments, the metal can include specific illustrative metals such as for example Pt, Ir, Cr, Sn, or some combinations thereof. In some embodiments, the metal can include a metal that has a relatively high resistance to oxidation so that the adhesion layer is not oxidized during use of the NFT. In some such embodiments, the metal can include specific illustrative metals such as for example Ir, Pt, Pd, Nb, Ru, Re, Ta, Nb, Os, Al, B, W, Ti, Cr, Si, Ni, or combinations thereof. Alloys of two or more metals can also be utilized.

In some embodiments, the second material in an intermixing layer can include a metal, specific illustrative metals can include for example zirconium (Zr), titanium (Ti), yttrium (Y), scandium (Sc), aluminum (Al), ruthenium (Ru), vanadium (V), silicon (Si), germanium (Ge), tantalum (Ta), and tin (Sn). In some embodiments, the second material in an intermixing layer can include a metal; specific illustrative metals can include for example cobalt (Co), nickel (Ni), chromium (Cr), tungsten (W), titanium tungsten (TiW), molybdenum (Mo), magnesium (Mg), niobium (Nb), hafnium (Hf), zinc (Zn), or some combination thereof. Alloys of two or more metals can also be utilized.

Specific illustrative intermixing layers can contain gold as a first material and a metal as a second material. Such intermixing layers could therefore be characterized as a gold alloy with a gold phase, or a gold alloy with an intermetallic phase. Such intermixing layers may increase the oxidation resistance of other elements (impurities) in the gold due to a gas barrier layer of fact of the gold. Such intermixing layers may reduce mismatches in physical, mechanical, thermal, or some combination thereof between over and underlying layers, and also reduce the interface energy.

In some embodiments, the second material in an intermixing layer can include a nitride; specific illustrative nitrides can include for example chromium nitride (CrN), boron nitride (BN), niobium nitride (NbN), silicon nitride (SiN), aluminum nitride (AlN), or some combination thereof. In some embodiments, the second material in an intermixing layer can include a nitride; specific illustrative nitrides can include for example titanium nitride (TiN), zirconium nitride (ZrN), tantalum nitride (TaN), hafnium nitride (HfN) or some combination thereof. Nitrides including two or more non-nitrogen atoms can also be utilized herein.

In some embodiments, the second material in an intermixing layer can include an oxide, specific illustrative oxides can include for example aluminum oxide (AlO), yttrium oxide (YO), indium oxide ($In_2O_3$), tin oxide ($SnO_2$), zinc oxide (ZnO) (e.g., doped ZnO, for example aluminum (Al) doped ZnO, or gallium (Ga) doped ZnO), beryllium oxide (BeO), silicon oxide (SiO), iron oxide (FeO), titanium oxide (TiO), zirconium oxide (ZrO), tantalum oxide (TaO), manganese oxide (MnO), cadmium oxide (CdO), magnesium oxide (MgO), hafnium oxide (HfO), chromium oxide (CrO), strontium oxide (SrO), niobium oxide (NbO), or some combination thereof. In some embodiments, the oxide can include specific illustrative oxides such as for example, tin oxide (SnO), indium oxide (InO), or some combination thereof. In some embodiments, the oxide can include specific illustrative oxides such as for example, beryllium oxide (BeO), silicon oxide (SiO), iron oxide (FeO), aluminum oxide (AlO), titanium oxide (TiO), zirconium oxide (ZrO), tantalum oxide (TaO), manganese oxide (MnO), cadmium oxide (CdO), tin oxide (SnO), indium oxide (InO), indium tin oxide (ITO), or some combination thereof. It should be noted that oxides can include any stoichiometry including the particular noted element and oxygen. For example silicon oxide includes both silicon dioxide ($SiO_2$) and silicon monoxide (SiO). Oxides including two or more non-oxygen atoms can also be utilized herein, examples can include $In_2O_3$—$SnO_2$ (ITO) (e.g., a solid solution), TaSiO, AlSiO, and YAlO.

In some embodiments, the second material in an intermixing layer can include a carbide specific illustrative carbides can include for example tantalum carbide (TaC), uranium carbide (UC), hafnium carbide (HfC), zirconium carbide (ZrC), scandium carbide (ScC), manganese carbide (MnC), iron carbide (FeC), niobium carbide (NbC), technetium carbide (TcC), rhenium carbide (ReC), or some combination thereof. In some embodiments, the carbide can include specific illustrative carbides such as for example, vanadium carbide (VC), tungsten carbide (WC), titanium carbide (TiC), chromium carbide (CrC), cobalt carbide (CoC), nickel carbide (NiC), yttrium carbide (YC), molybdenum carbide (MoC), or some combination thereof. In some embodiments, the carbide can include specific illustrative carbides such as for example, vanadium carbide (VC), tantalum carbide (TaC), titanium carbide (TiC), uranium carbide (UC), tungsten carbide (WC), hafnium carbide (HfC), zirconium carbide (ZrC), chromium carbide (CrC), scandium carbide (ScC), manganese carbide (MnC), iron carbide (FeC), cobalt carbide (CoC), nickel carbide (NiC), yttrium carbide (YC), niobium carbide (NbC), molybdenum carbide (MoC), technetium carbide (TcC), rhenium carbide (ReC), or some combination thereof. In some embodiments, the second material in an intermixing layer can include a carbide specific illustrative carbides can include for example silicon carbide (SiC), hydrogenated silicon carbide (SiC:H), or combinations thereof, for example. Carbides including two or more non-carbon atoms can also be utilized herein.

In some embodiments, the second material in an intermixing layer can include a sulfide, specific illustrative sulfides can include for example zirconium sulfides, zinc sulfides, titanium sulfides, cobalt sulfides, silver sulfides, copper sulfides, indium sulfides, cadmium sulfides, tin sulfides, bismuth sulfides, lead sulfides, selenium sulfides, iron sulfides, molybdenum sulfides, and combinations thereof. It should be noted that sulfides can include any stoichiometry including the particular noted element and sulfur. Sulfides including two or more non-sulfur atoms can also be utilized herein.

Specific illustrative intermixing layers can contain gold as a first material and a nitride, oxide, carbide, or sulfide as a second material. Such intermixing layers could therefore be characterized as including gold atoms in the intermixing layer that could form gold atom clusters or gold nanoparticles.

Such gold nanoparticles could significantly improve the adhesion between the gold and the oxide, nitride, carbide, or sulfide adhesion layer due to an increased surface contact area as well as mechanical interlock.

In some embodiments, a disclosed intermixing layer can have a thickness that is at least 0.1 nm (1 Å), in some embodiments at least 0.2 nm (2 Å), or in some embodiments at least 1 nm (10 Å). In some embodiments, a disclosed intermixing layer can have a thickness that is not greater than 100 nm (1000 Å), in some embodiments not greater than 40 nm (400 Å), in some embodiments, not greater than 5 nm (50 Å), or in some embodiments not greater than 3.5 nm (35 Å). The thickness (e.g., the average thickness) of an intermixing layer can be measured using, for example, transmission electron microscopy (TEM), X-ray reflectivity (XRR), or x-ray photoelectron spectroscopy (XPS). The thickness can be determined using calibration from standard samples having known thicknesses, for example.

Disclosed intermixing layers that include a first material and a second material can be a single layer that has a single substantially homogeneous composition across the intermixing layer. In some embodiments, disclosed intermixing layers can have a composition that is not substantially homogeneous across the entirety of the intermixing layer. For example, in some embodiments, a disclosed intermixing layer can have a composition that changes from one surface to the other, or can have a compositional gradient. For example, a disclosed intermixing layer can have an amount of a first material (or a second material) that changes from one surface to the other. More specifically, a disclosed intermixing layer can have an amount of a first material that changes from a first surface to a second surface (the second surface opposite the first surface). An illustrative example includes an intermixing layer having an amount of a first material that changes from a first surface, the first surface in physical contact with a NFT (for example) to a second surface, the second surface in physical contact with an adhesion layer (for example). Another specific illustrative example includes an intermixing layer having an amount of gold that changes from a first surface in physical contact with a NFT to a second surface in physical contact with an adhesion layer. Another specific illustrative example includes an intermixing layer having a composition that changes from almost 100% gold at a first surface in physical contact with a NFT to almost 100% second material at a second surface in physical contact with an adhesion layer.

Disclosed intermixing layers, for example intermixing layers containing a first material and a second material can be formed using various processes. In some embodiments, disclosed intermixing layers containing a first material and a second material can be formed by co-deposition of the first material and the second material. For example disclosed intermixing layers could be formed by co-deposition of an NFT material or a seed layer material and an adhesion layer material. For example disclosed intermixing layers could be formed by co-deposition of gold and a metal, oxide, nitride, carbide, or sulfide. In some embodiments, the intermixing layer can include multiple intermixing layers that may or may not have different compositions, and may or may not compositional gradients that may or may not be the same. In some embodiments, an intermixing layer can have a composition such that the concentration of the second material increases across the layer from the interface with the underlying structure (that can include the first material) to the interface with the overlying structure (that can include the second material).

In some embodiments, an intermixing layer can also be formed by depositing alternating layers of the first and the second materials. The layer thickness of the first and the second material can be varied to produce an intermixing layer having a desired concentration. In some embodiments, an intermixing layer composed of alternating layers of a first material and a second material can have a composition such that the concentration of the second material increases across the layer from the interface with the underlying structure (that can include the first material) to the interface with the overlying structure (that can include the second material), in such embodiments this could be accomplished by changing the thicknesses of the two layers.

Disclosed intermixing layers containing a first material and a second material could also be formed by electrochemical methods, physical vapor deposition methods, chemical vapor deposition methods, or various combinations thereof. Disclosed intermixing layers containing a first material and a second material could also be formed using ion implantation, high temperature deposition, high bias deposition, thermal annealing, laser radiation, electron beam radiation, or various combinations thereof.

Figure 4B:
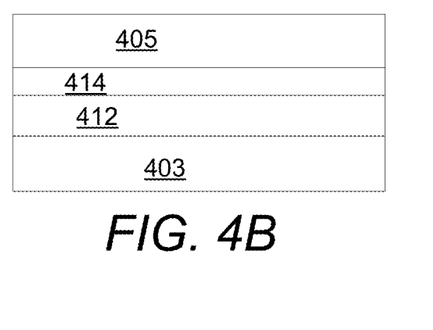
Figure 4C:
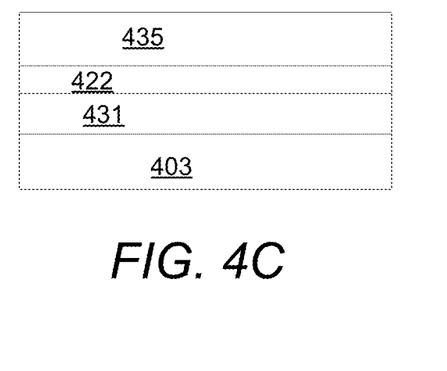

Disclosed intermixing layers can also be formed by depositing an intermixing layer including a first material and a second material, the first and second material being in common with layers or structures adjacent the intermixing layer, and then oxidizing the surface of the intermixing layer not physically in contact with the NFT. Such an intermixing layer is depicted in FIG. 4B. A step of oxidizing the top surface of the intermixing layer 412 can function to form an oxidation layer 414 thereon which may improve the optical properties of the intermixing layer, improve thermal stability of the intermixing layer, improve adhesion with adjacent structures, or any combination thereof. In some illustrative embodiments such intermixing layers can be deposited using ion implantation, high temperature deposition, high bias deposition, or deposition followed by thermal annealing to improve the adhesion of the intermixing layer to the NFT peg. Then the top surface of the intermixing layer 412 could be oxidized using plasma oxidation, air oxidation, ozone oxidation, or thermal oxidation, for example to form an oxidation layer 414 that could improve the adhesion of the intermixing layer to overlying structure 405.

In some particular embodiments, intermixing layers that are adjacent an NFT can include an alloy that contains the NFT material and at least a secondary element. Such intermixing layers can be, but need not be referred to as alloy intermixing layers. Such alloy intermixing layers can take advantage of the excellent optical properties of the NFT material (for example gold) and the relatively high thermal stability of an alloy including the NFT material. As such, these types of alloy intermixing layers may be able to be more advantageous than having the entire NFT or peg made entirely of the alloy. It should also be noted that such alloy intermixing layers can be utilized in instances where the peg is made of an alloy. In such instances, the alloy intermixing layer could have a higher content of the secondary element than the alloy of the peg, because there won't be such a high optical penalty because of the relatively small thickness of the alloy intermixing layer. Also, in instances where the secondary element is the same in the peg and the alloy intermixing layer, the system could benefit from both structures having the same crystalline structure. This would mean that the interface could have very low interface energy, thereby reducing the interface diffusion.

Figure 5A:
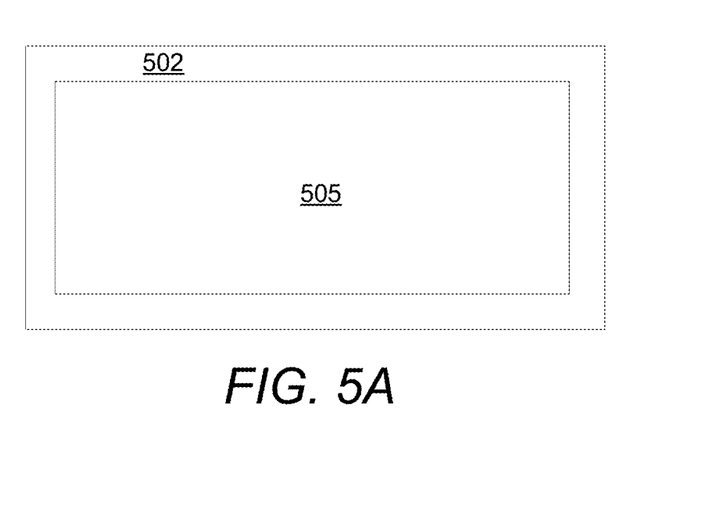
FIGS. 5A and 5B are views from the air bearing surface (ABS) of a peg containing disclosed adhesion layers.

Such alloy intermixing layers can be included on all surfaces of the NFT, or less than all surfaces of the NFT. In some embodiments, such alloy intermixing layers can be included on all surfaces of a peg and disc type NFT. In some embodiments, such alloy intermixing layers can be included on all surfaces of a peg except for the ABS. Referring back to FIGS. 3A and 3B, such alloy intermixing layers could be included, for example, on a first surface 307, a second surface 309, a third surface 308, and a fourth surface 311 of the peg illustrated in FIGS. 3A and 3B. FIG. 5A illustrates a peg 505 as viewed from the ABS, that has an alloy intermixing layer 502 on all four surfaces thereof. As seen there, the alloy intermixing layer 502 is depicted as a single contiguous layer that is located on all four surfaces of the peg. It should also be noted that the alloy intermixing layers on the four surfaces could be disposed separately, discontinuous with the adjacent intermixing layers, or some combination thereof.

The alloy making up such illustrative alloy intermixing layers can be referred to as a NFT material/X alloy. In some embodiments, the NFT can be made of gold or a gold alloy. In such embodiments, the alloy of the alloy intermixing layer can be given as AuX. X can include, for example cobalt (Co), nickel (Ni), chromium (Cr), platinum (Pt), boron (B), iron (Fe), aluminum (Al), tantalum (Ta), tungsten (W), silicon (Si), titanium (Ti), iridium (Ir), zirconium (Zr), or some combination thereof. In some embodiments, the alloy intermixing layer can include a ternary alloy. In some embodiments, the NFT can be made of gold and the alloy intermixing layer can be a gold cobalt alloy, for example.

An alloy of an alloy intermixing layer can have various amounts of the secondary element. In some embodiments, an alloy of an alloy intermixing layer can have not less than 0.1 at % (atomic percent) secondary element (X), or in some embodiments, not less 5 at %. In some embodiments, an alloy of an alloy intermixing layer can have not greater than 90 at % secondary element (X), or in some embodiments, not greater than 50 at %.

In some embodiments, disclosed alloy intermixing layers can have a thickness that is at least 0.1 nm (1 Å), or in some embodiments at least 1 nm (10 Å). In some embodiments, disclosed alloy intermixing layer can have a thickness that is not greater than 40 nm (400 Å), or in some embodiments, not greater than 15 nm (150 Å). The thickness (e.g., the average thickness) of an alloy intermixing layer can be measured using, for example, transmission electron microscopy (TEM), X-ray reflectivity (XRR), or x-ray photoelectron spectroscopy (XPS). The thickness can be determined using calibration from standard samples having known thicknesses, for example.

Figure 5B:
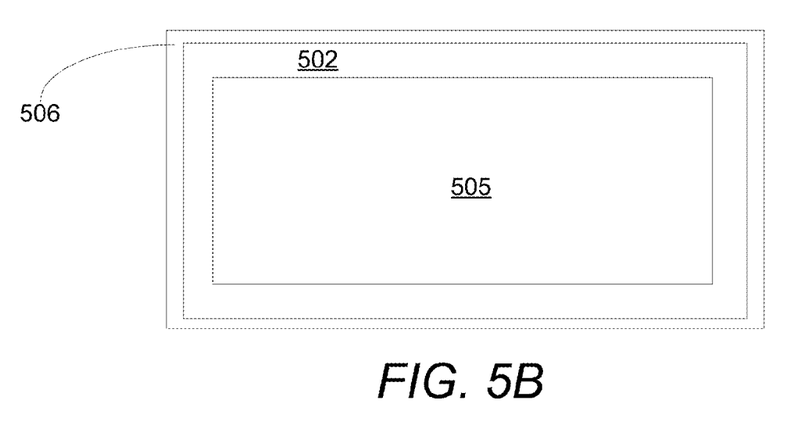

In some particular embodiments intermixing layers that are adjacent a seed layer can include an alloy that contains the seed layer material and at least a secondary element. Such embodiments can be similar to the embodiment depicted in FIG. 4A, where the underlying structure 403 is the peg and the overlying structure 405 is a seed layer. FIG. 5B illustrates a peg 505 with an alloy intermixing layer 502 thereon, and a seed layer 506 thereon. The seed layer 506 can be utilized to aid in the deposition of, or modulate the properties of a layer formed thereon, for example an overcoat layer. The material of the seed layer can depend at least in part on the material that is being deposited after the seed layer (for example the material of the overcoat layer or the CNS, NPS, cladding, or combinations thereof). In some embodiments, the seed layer can include a metal. In some embodiments, illustrative metals can include, for example chromium (Cr), nickel (Ni), cobalt (Co), tungsten (W), titanium (Ti), platinum (Pt), iridium (Ir), tantalum (Ta), zirconium (Zr), molybdenum (Mo), rhodium (Rh), ruthenium (Ru), niobium (Nb), yttrium (Y), palladium (Pd), or some combination thereof. In some embodiments, illustrative metals can include, for example Cr. The seed layer can have various thicknesses. In some embodiments, the seed layer can have a thickness that is at least 0.05 nm (0.5 Å), or in some embodiments at least 0.5 nm (5 Å). In some embodiments, the seed layer can have a thickness that is not greater than 40 nm (400 Å), or in some embodiments not greater than 5 nm (50 Å).

Utilization of a disclosed alloy intermixing layer and an optional seed layer could function to reduce the interface energy of the peg (e.g., made of gold) with the surrounding materials to increase the thermal stability of the peg.

In some embodiments, an alloy intermixing layer could be disposed on more than just the peg of the NFT. For example, an intermixing layer (alloy intermixing layer or otherwise) can be disposed on one or more than one surface of the entire rod, for example. The rod can generally be described as the back portion of the peg (in a direction directed away from the ABS of the peg). Alternatively, the rod can be described by the process by which it is formed in that the peg is part of the rod, and the peg is described as the front portion (towards the ABS) only of the rod. In some embodiments, the rod can be the peg.

Figure 6A:
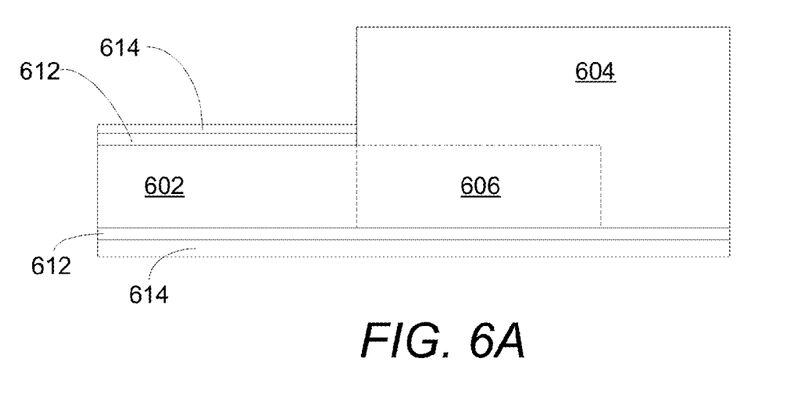
FIGS. 6A and 6B are cross section views of NFTs including intermixing layers and optional seed layers.

FIG. 6A shows a side view of a NFT showing the peg 602, the disk 604, and the rod 606. The embodiment in FIG. 6A includes an intermixing layer 612 and a seed layer 614 located on at least two surfaces (the surfaces analogous to the first surface 307 and the second surface 309 in FIGS. 3A and 3B) of the peg. The intermixing layer 612 and seed layer 614 located on the bottom surface (analogous to the first surface 307 in FIGS. 3A and 3B) can be configured to be in contact with the entire peg 602, the entire rod 606 and even in contact with the disc 604.

In some embodiments, an alloy intermixing layer could be disposed on the four surfaces of the peg (a first surface 307, a second surface 309, a third surface 308, and a fourth surface 311 of the peg illustrated in FIGS. 3A and 3B) and a seed layer (as discussed in connection with the alloy intermixing layer) exists only on the first surface 307. Such a configuration could offer all the advantageous properties provided by alloy intermixing layers but reduce the impact of the poor optical properties of the seed layer material and the decrease in optical properties of the peg that can be caused by diffusion of the seed layer material into the peg.

In some embodiments, the ABS 306 of the peg 305 could include an alloy intermixing layer thereon. In some such embodiments, the alloy intermixing layer could be formed, for example, by diffusion of a layer of X (secondary element) or AuX from the ABS surface or ion implantation, or high bias deposition of X from the ABS.

Figure 6B:
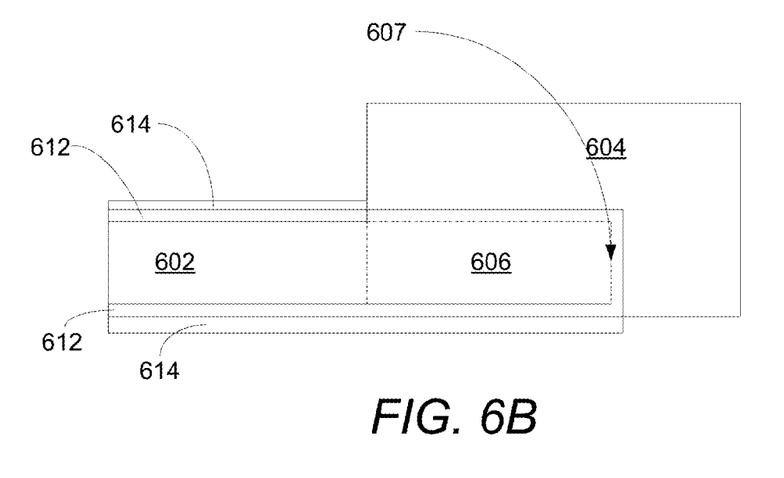

FIG. 6B shows a side view of a NFT showing the peg 602, the disk 604, and the rod 606. The embodiment in FIG. 6B includes an intermixing layer 612 and a seed layer 614 located on at least two surfaces (the surfaces analogous to the first surface 307 and the second surface 309 in FIGS. 3A and 3B) of the peg. The intermixing layer 612 is also located on the rod 606. As seen in FIG. 6B, the intermixing layer 612 is located on the surfaces of the rod 606 where it contacts the disc 604. The seed layer 614 is located on the bottom surface (analogous to the first surface 307 in FIGS. 3A and 3B) of the peg 602 and rod 606, but is not on a back surface 607 of the rod.

In such embodiments, an intermixing layer (e.g., an alloy intermixing layer) could also function as a barrier layer between the rod 606 and the disk 604. This could serve to reduce the effective area of the rod, the peg to rod volume ratio, and the total defects inside the rod. All of these factors could serve to increase the thermal stability of the peg. The use of the NFT material/X alloy would serve to isolate the rod from the peg without increasing the temperature of the peg because the material of the NFT material/X alloy would have optical properties very similar to that of the NFT material itself.

Intermixing layers located on the bottom surface (the first surface 307 in FIGS. 3A and 3B) of the NFT can also be described as being located between the NFT and the substrate on which the NFT is formed. In such embodiments, an intermixing layer (e.g., an alloy intermixing layer) can function to affect the adhesion of the NFT to the substrate (or the NFT to an adhesion layer formed on the substrate) while modulating CTE mismatches, lattice mismatches, thermal stresses, and interface energies between the two.

In such embodiments, an intermixing layers on the first surface 307 of the peg (e.g., the bottom surface or the surface between the NFT and the substrate upon which it is formed) can include, for example chromium (Cr), silicon (Si), aluminum (Al), nickel (Ni), titanium (Ti), iridium (Ir), niobium (Nb), tantalum (Ta), zirconium (Zr), hafnium (Hf), yttrium (Y), or some combination thereof. Intermixing layers on the first surface 307 of the peg can have various thicknesses. In some embodiments, intermixing layers on the first surface 307 of the peg can have a thickness that is not less than 0.1 nm (1 Å), or in some embodiments at least 0.5 nm (5 Å). In some embodiments, intermixing layers on the first surface 307 of the peg can have a thickness that is not greater than 40 nm (400 Å), or in some embodiments, not greater 5 nm (50 Å). The thickness (e.g., the average thickness) of such an intermixing layer can be measured using, for example, transmission electron microscopy (TEM), X-ray reflectivity (XRR), or x-ray photoelectron spectroscopy (XPS). The thickness can be determined using calibration from standard samples having known thicknesses, for example.

In such embodiments, intermixing layers on the first surface 307 of the peg can include, for example a NFT material (e.g., gold) and a secondary element (X). In some embodiments, X can be selected from aluminum (Al), silicon (Si), nickel (Ni), cobalt (Co), boron (B), bismuth (Bi), indium (In), sulfur (S), tin (Sn), hafnium (Hf), niobium (Nb), carbon (C), manganese (Mn), antimony (Sb), tellurium (Te), sodium (Na), vanadium (V), yttrium (Y), nitrogen (N), oxygen (O), erbium (Er), holmium (Ho), lutetium (Lu), praseodymium (Pr), scandium (Sc), uranium (U), zinc (Zn), lanthanum (La), neodymium (Nd), strontium (Sr), platinum (Pt), barium (Ba), chlorine (Cl), cerium (Cs), dysprosium (Dy), europium (Eu), fluorine (F), gadolinium (Gd), germanium (Ge), hydrogen (H), iodine (I), osmium (Os), rhenium (Re), phosphorus (P), rubidium (Rb), selenium (Se), samarium (Sm), terbium (Tb), thulium (Th), beryllium (Be), calcium (Ca), cesium (Ce), Gallium (Ga), potassium (K), lithium (Li), and combinations thereof for example. In some embodiments, X can be selected from boron (B), bismuth (Bi), indium (In), sulfur (S), tin (Sn), hafnium (Hf), niobium (Nb), carbon (C), manganese (Mn), antimony (Sb), tellurium (Te), erbium (Er), holmium (Ho), lutetium (Lu), praseodymium (Pr), scandium (Sc), uranium (U), zinc (Zn), barium (Ba), chlorine (Cl), cesium (Cs), dysprosium (Dy), europium (Eu), fluorine (F), gadolinium (Gd), germanium (Ge), hydrogen (H), iodine (I), osmium (Os), phosphorus (P), rubidium (Rb), rhenium (Re), selenium (Se), samarium (Sm), terbium (Tb), thulium (Th), and combinations thereof for example. In some embodiments, X can be selected from sodium (Na), nickel (Ni), vanadium (V), yttrium (Y), nitrogen (N), oxygen (O), lanthanum (La), neodymium (Nd), strontium (Sr), platinum (Pt), beryllium (Be), calcium (Ca), cerium (Ce), Gallium (Ga), potassium (K), lithium (Li), and combinations thereof for example. In some embodiments, the alloy intermixing layer can include a ternary alloy. In some embodiments, X can include, for example NiAl or CoNi (e.g., forming a ternary alloy with the NFT material).

An alloy of an intermixing layer can have various amounts of the secondary element. In some embodiments, an alloy of an intermixing layer can have not less than 0.1 at % (atomic percent) secondary element (X), or in some embodiments, not less than 0.5 at %. In some embodiments, an alloy of an intermixing layer can have not greater than 90 at % secondary element (X), or in some embodiments, not greater than 5 at %.

Illustrative processes for forming layers of materials disclosed herein can include for example, deposition methods such as chemical vapor deposition (CVD), physical vapor deposition (PVD), atomic layer deposition (ALD), plating (e.g., electroplating), sputtering methods, cathodic arc deposition methods, ion implantation method and evaporative methods.

Processes to form the disclosed layers could be easily integrated into the overall manufacturing process of the device. Overall, the use of disclosed intermixing layers would decrease or eliminate yield loss due to delamination of the NFT and contribute to increased NFT lifetime during the operation of the magnetic device with very little effect on current formation processes for the device.

Intermixing layers, similar to those described herein could also be utilized to improve adhesion between two different oxide layers. For example, an intermixing layer could be utilized between any two of the CNS, the NPS, the cladding, and the head overcoat layer. Such structures or layers can be made of various oxides, for example, and disclosed intermixing layers could be utilized to improve adhesion and address mismatches in physical and mechanical properties thereof.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of devices including at least one intermixing layer are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A device comprising:
   a near field transducer (NFT), the NFT comprising a peg having five exposed surfaces, the peg comprising a first material;
   an overlying structure;
   at least one intermixing layer, positioned between the peg and the overlying structure, the at least one intermixing layer positioned on at least one of the five surfaces of the peg, the intermixing layer comprising at least the first material and a second material.

2. The device according to claim 1, wherein the peg comprises gold or an alloy thereof.

3. The device according to claim 2, wherein the second material is selected from a metal, an oxide, a nitride, a carbide, or a sulfide.

4. The device according to claim 1, wherein the second material is selected from:
   rhenium (Re), osmium (Os), iridium (Ir), platinum (Pt), tantalum (Ta), ruthenium (Ru), technetium (Tc), rhodium (Rh), palladium (Pd), beryllium (Be), aluminum (Al), manganese (Mn), indium (In), boron (B), tungsten (W), molybdenum (Mo), chromium (Cr), silicon (Si), nickel (Ni), titanium (Ti), yttrium (Y), vanadium (V), magnesium (Mg), cobalt (Co), tin (Sn), niobium (Nb), hafnium (Hf), zirconium (Zr), titanium (Ti), scandium (Sc), ruthenium (Ru), germanium (Ge), neodymium (Nd), iron (Fe), and combinations thereof;
   chromium nitride (CrN), boron nitride (BN), titanium nitride (TiN), zirconium nitride (ZrN), tantalum nitride (TaN), hafnium nitride (HfN), silicon nitride (SiN), aluminum nitride (AlN), hafnium nitride (HfN), niobium nitride (NbN), and combinations thereof;
   indium oxide ($In_2O_3$), tin oxide ($SnO_2$), zinc oxide (ZnO), beryllium oxide (BeO), silicon oxide (SiO), iron oxide (FeO), titanium oxide (TiO), zirconium oxide (ZrO), tantalum oxide (TaO), manganese oxide (MnO), cadmium oxide (CdO), magnesium oxide (MgO), hafnium oxide (HfO), aluminum oxide (AlO), yttrium oxide (YO), chromium oxide (CrO), strontium oxide (SrO), niobium oxide (NbO), and combinations thereof;
   tantalum carbide (TaC), uranium carbide (UC), hafnium carbide (HfC), zirconium carbide (ZrC), scandium carbide (ScC), manganese carbide (MnC), iron carbide (FeC), niobium carbide (NbC), technetium carbide (TcC), rhenium carbide (ReC), vanadium carbide (VC), tungsten carbide (WC), titanium carbide (TiC), chromium carbide (CrC), cobalt carbide (CoC), nickel carbide (NiC), yttrium carbide (YC), molybdenum carbide (MoC), silicon carbide (SiC), hydrogenated silicon carbide (SiC:H), and combinations thereof; and
   zirconium sulfides, zinc sulfides, titanium sulfides, cobalt sulfides, silver sulfides, copper sulfides, indium sulfides, cadmium sulfides, tin sulfides, bismuth sulfides, lead sulfides, selenium sulfides, iron sulfides, molybdenum sulfides, and combinations thereof.

5. The device according to claim 1, wherein the at least one intermixing layer has a thickness from about 0.1 nm to about 100 nm.

6. The device according to claim 1, wherein the at least one intermixing layer has a composition gradient across the intermixing layer from a first surface of the intermixing layer to a second opposing surface of the intermixing layer.

7. The device according to claim 1, wherein the at least one intermixing layer comprises alternating layers of the first material and the second material.

8. The device according to claim 7, wherein the alternating layers of the first material and the second material have changing thicknesses to create an overall compositional gradient.

9. The device according to claim 1, wherein a portion of the intermixing layer has been oxidized.

10. The device according to claim 1, wherein the at least one intermixing layer is positioned on at least four surfaces of the peg.

11. A device comprising:
    a near field transducer (NFT), the NFT comprising a peg having five exposed surfaces;
    at least one seed layer, the at least one seed layer positioned on at least one of the five surfaces of the peg, the seed layer comprising a first material;
    an overlying structure;
    at least one intermixing layer, positioned between the seed layer and the overlying structure, the at least one intermixing layer positioned on at least one of the five surfaces of the peg, the intermixing layer comprising at least the first material and a second material.

12. The device according to claim 11, wherein the first material is selected from: rhenium (Re), tungsten (W), osmium (Os), iridium (Ir), platinum (Pt), hafnium (Hf), tantalum (Ta), ruthenium (Ru), technetium (Tc), molybdenum (Mo), niobium (Nb), rhodium (Rh), palladium (Pd), beryllium (Be), chromium (Cr), silicon (Si), nickel (Ni), titanium (Ti), aluminum (Al), yttrium (Y), vanadium (V), magnesium (Mg), manganese (Mn), cobalt (Co), or combinations thereof.

13. The device according to claim 11, wherein the second material is selected from:
    rhenium (Re), osmium (Os), iridium (Ir), platinum (Pt), tantalum (Ta), ruthenium (Ru), technetium (Tc), rhodium (Rh), palladium (Pd), beryllium (Be), aluminum (Al), manganese (Mn), indium (In), boron (B), tungsten (W), molybdenum (Mo), chromium (Cr), silicon (Si), nickel (Ni), titanium (Ti), yttrium (Y), vanadium (V), magnesium (Mg), cobalt (Co), tin (Sn), niobium (Nb), hafnium (Hf), zirconium (Zr), titanium (Ti), scandium (Sc), ruthenium (Ru), germanium (Ge), neodymium (Nd), iron (Fe), and combinations thereof;

chromium nitride (CrN), boron nitride (BN), titanium nitride (TiN), zirconium nitride (ZrN), tantalum nitride (TaN), hafnium nitride (HfN), silicon nitride (SiN), aluminum nitride (AlN), hafnium nitride (HfN), niobium nitride (NbN), and combinations thereof;

indium oxide ($In_2O_3$), tin oxide ($SnO_2$), zinc oxide (ZnO), beryllium oxide (BeO), silicon oxide (SiO), iron oxide (FeO), titanium oxide (TiO), zirconium oxide (ZrO), tantalum oxide (TaO), manganese oxide (MnO), cadmium oxide (CdO), magnesium oxide (MgO), hafnium oxide (HfO), aluminum oxide (AlO), yttrium oxide (YO), chromium oxide (CrO), strontium oxide (SrO), niobium oxide (NbO), and combinations thereof;

tantalum carbide (TaC), uranium carbide (UC), hafnium carbide (HfC), zirconium carbide (ZrC), scandium carbide (ScC), manganese carbide (MnC), iron carbide (FeC), niobium carbide (NbC), technetium carbide (TcC), rhenium carbide (ReC), vanadium carbide (VC), tungsten carbide (WC), titanium carbide (TiC), chromium carbide (CrC), cobalt carbide (CoC), nickel carbide (NiC), yttrium carbide (YC), molybdenum carbide (MoC), silicon carbide (SiC), hydrogenated silicon carbide (SiC:H), and combinations thereof; and zirconium sulfides, zinc sulfides, titanium sulfides, cobalt sulfides, silver sulfides, copper sulfides, indium sulfides, cadmium sulfides, tin sulfides, bismuth sulfides, lead sulfides, selenium sulfides, iron sulfides, molybdenum sulfides, and combinations thereof.

14. The device according to claim 11, wherein the at least one intermixing layer has a thickness from about 0.1 nm to about 100 nm.

15. The device according to claim 11, wherein the at least one intermixing layer has a composition gradient across the intermixing layer from a first surface of the intermixing layer to a second opposing surface of the intermixing layer.

16. The device according to claim 11, wherein the overlying structure comprises a dielectric material.

17. The device according to claim 11, wherein the at least one intermixing layer is positioned on at least four surfaces of the peg.

18. A device comprising:
an energy source;
a near field transducer (NFT), the NFT configured to receive energy from the energy source, the NFT comprising a peg having five exposed surfaces, the peg comprising a first material;
an overlying structure; and
at least one intermixing layer, positioned between the peg and the overlying structure, the at least one intermixing layer positioned on at least one of the five surfaces of the peg, the intermixing layer comprising at least the first material and a second material.

19. The device according to claim 18, wherein the energy source comprises a laser.

20. The device according to claim 18 further comprising a waveguide, the waveguide configured to receive the energy from the energy source and couple it into the NFT.

* * * * *